H. H. HIRSCH.
ELECTRIC STORAGE BATTERY.
APPLICATION FILED JAN. 15, 1914.
1,177,328.
Patented Mar. 28, 1916.
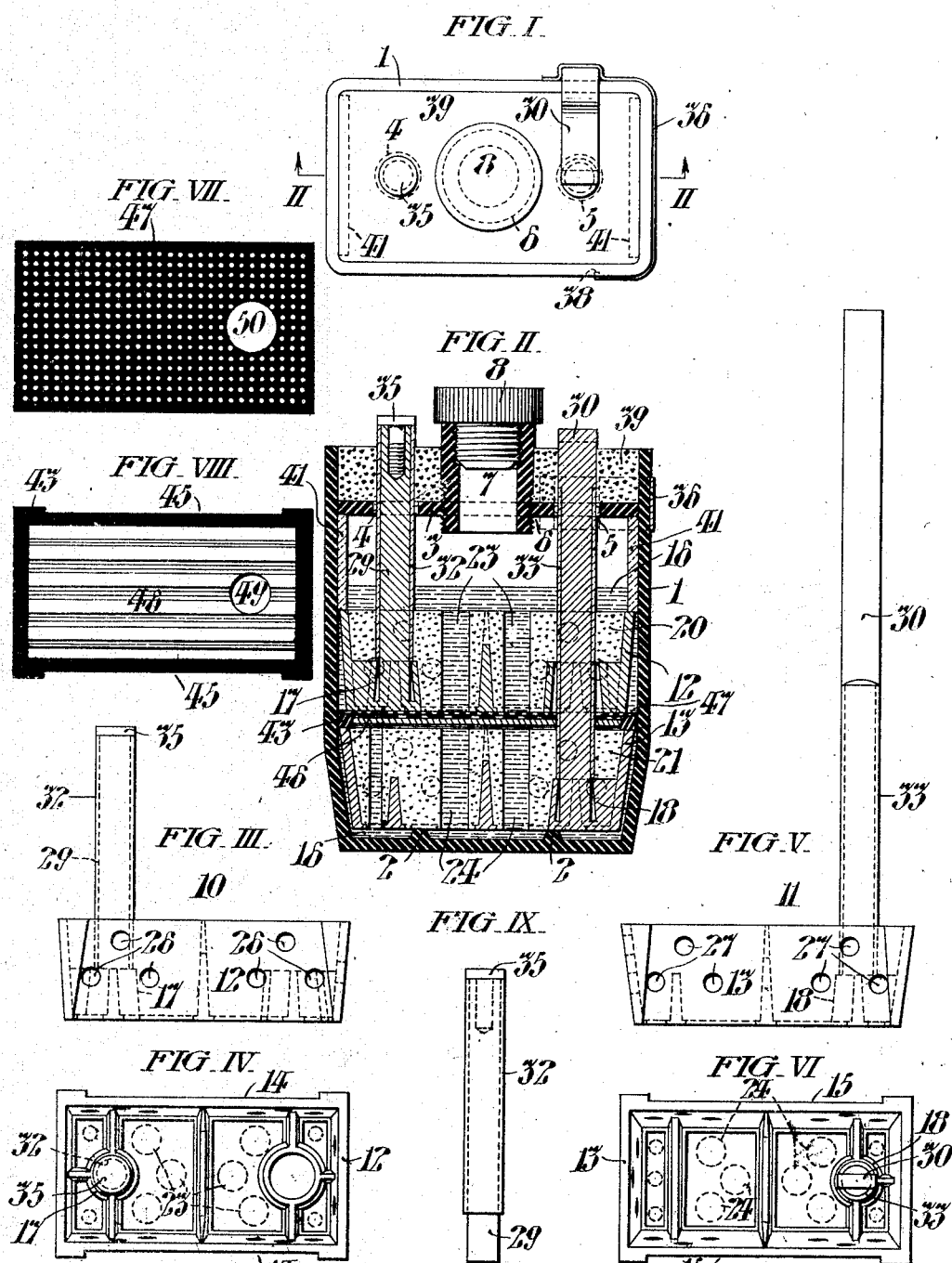

UNITED STATES PATENT OFFICE.

HIRAM HARRY HIRSCH, OF PHILADELPHIA, PENNSYLVANIA.

ELECTRIC STORAGE BATTERY 1,177,328.  Specification of Letters Patent.  Patented Mar. 28, 1916.

Application filed January 15, 1914. Serial No. 812,217.

*To all whom it may concern:*

Be it known that I, HIRAM H. HIRSCH, a citizen of the United States, residing at Philadelphia, in the State of Pennsylvania, have invented a certain new and useful Improvement in Electric Storage Batteries, whereof the following is a specification, reference being had to the accompanying drawing.

My invention is particularly applicable to a portable storage battery designed to be used in connection with a miner's lamp and having plates disposed in horizontal position. However, my improvements may be advantageously utilized in any battery to afford a maximum area of surface of the active material exposed to the electrolyte.

As hereinafter described my invention relates to the construction and arrangement of the battery plates and provides glass sleeves for the battery plate terminals; such a sleeve on the terminal of the lower plate serving to insulate it from the upper plate through which it extends.

My invention includes the various novel features of construction and arrangement hereinafter more definitely specified, and the method of producing battery plates with glass insulated terminals.

In the drawings:—Figure I is a plan view of a battery conveniently embodying my improvement. Fig. II is a vertical sectional view of said battery taken on the line II, II in Fig. I. Fig. III is a side elevation of the upper battery plate shown in Fig. II. Fig. IV is a plan view of said plate shown in Fig. III. Fig. V is an elevation of the lower battery plate shown in Fig. II. Fig. VI is a plan view of said battery plate shown in Fig. V. Fig. VII is a plan view of the foraminous insulating diaphragm which extends between the battery plates as shown in Fig. II. Fig. VIII is a plan view of the porous diaphragm which is provided with an insulating frame between said plates as shown in Fig. II. Fig. IX is a side elevation of the glass covered terminal of the battery plate shown in Fig. III, in its primary form, before its embodiment in connection with said plate.

In said figures: the cell 1, of insulating material, for instance, glass, hard rubber or other molded material, has the internal ribs 2 at the bottom thereof, and the cover 3 at the top thereof. Said cover has the electrode terminal outlets 4 and 5 and the electrolyte inlet 6 screw threaded for the inlet tube 7 which has the screw plug 8. The two electrodes 10 and 11 are opposed in horizontally parallel position in said cell 1, and respectively comprise the rectangular grids 12 and 13, which are hollow frames of cast metal, of greater area at the top than at the bottom, open at the top and bottom, and having recessed passageways 14 and 15, for the electrolyte 16, in respectively opposite vertical walls which form the sides of said grids, as shown in Figs. IV and VI. As shown in Fig. II; said grids 12 and 13 have inverted conical sockets 17 and 18 for their respective terminals, and respectively contain active material 20 and 21. Each of said electrodes has a plurality of vertical passageways, respectively 23 and 24, through its active material, and a plurality of horizontal openings 26 and 27 through its outer vertical walls, exposing said active material to the electrolyte 16. Said electrodes 10 and 11 have soft metal terminals 29 and 30 at respectively opposite ends thereof, fused in said sockets 17 and 18 and extending through said terminal outlets 4 and 5 in said cover 2; the terminal 30 of the lower electrode extending through the upper electrode. Said terminals 29 and 30 are cast in insulating tubular sleeves 32 and 33, preferably of glass, which respectively incase said terminals as shown in Fig. II; the sleeve 33 of the lower electrode extending through the upper electrode. The terminal 29 of the upper electrode, has the hard metal head 35 exterior to said cell 1 for engagement with a conductor, and the terminal 30 of the lower electrode has the hard metal strap 36 extending, horizontally, exterior to said cell contiguous with the outer surface thereof, the end of said strap being set in the recess 38 of said cell to prevent its displacement.

The plastic medium 39 seals the joint between said cell 1 and cover 3, the joint between said tube 7 and said cover, and the joints between said terminals 29 and 30 and said cover. The insulating spacing blocks 41, conveniently formed of sheet glass, which rest upon said upper electrode 10 and extend upwardly to said cover 3 at respectively opposite ends of the latter, are confined between said cell 1 and the respective terminals and normally hold said electrodes in the assembled position shown in Fig. II.

The separator between said electrodes 10 and 11 comprises the frame of insulating material 43, best shown in Fig. VIII, having recessed passageways 45 at opposite edges thereof for the electrolyte 16, the corrugated porous wood panel 46 fitted in said frame, and the foraminous diaphragm 47 of insulating material, for instance, hard rubber, which is coextensive with said frame 43 and supported thereby as shown in Fig. II. Said wood panel 46 and diaphragm 47 have respective apertures 49 and 50 in registry with each other for the terminal 30 of the lower electrode, which extends through the upper electrode, as shown in Fig. II.

The process of forming said battery electrode 10 consists in providing a grid 12 with the conical terminal socket 17; casting the soft metal core 29 in the glass tube 32, projecting beyond one end thereof, as shown in Fig. IX, and having the hard metal head 35 at the other end thereof, and fusing said terminal projection in said socket. The process of forming the battery electrode 11, consists in providing the grid 13 with the conical terminal socket 18; casting the soft metal core 30 in the glass tube 33, projecting at both ends thereof, and fusing one of said terminal projections in said socket. The upper projection of said core 30, shown in Fig. V, is primarily in alinement with the axis of the glass tube 33, but in assembling the elements of the battery, said projection is bent over the edge of the battery cell 1, as shown in Fig. I and electrically connected, preferably by solder, with the hard metal strap 36. Said two terminals are thus differently constructed as to their outer free ends, merely as a matter of convenience for electrical connection with a specific form of casing, which is not shown, and it is to be understood that both of said terminals may be provided with hard metal heads, or both with hard metal straps, or otherwise shaped and constructed.

I do not desire to limit myself to the precise details of construction and arrangement or method of procedure herein set forth as it is obvious that various modifications may be made therein without departing from the essential features of my invention as defined in the appended claims.

I claim:—

1. In an electric storage battery, the combination with a cell of insulating material; of a cover for said cell, having two electrode terminal outlets; two electrodes opposed in horizontally parallel position in said cell, each comprising a rectangular grid of cast metal of greater area at the top than at the bottom and having recessed passageways for electrolyte in respectively opposite vertical sides thereof, and having an inverted conical socket for its terminal; and active material in each of said grids; each of said electrodes having a plurality of vertical passageways through its active material, and a plurality of horizontal openings through its outer vertical walls; said electrodes having soft metal terminals at respectively opposite ends thereof, fused in said sockets and extending through said terminal outlets in said cover; the terminal of the lower electrode extending through the upper electrode; insulating tubular sleeves, of glass, respectively incasing said terminals, the sleeve of the lower electrode extending through the upper electrode; a hard metal head on the terminal of the upper electrode exterior to said cell; a hard metal strap on the terminal of the lower electrode extending, horizontally, exterior to said cell, in contact with the outer surface thereof; insulating spacing blocks, of sheet glass, confined between said cell and the respective terminals, resting upon said upper electrode and extending upwardly to said cover at respectively opposite ends of the latter; and a separator between said electrodes.

2. In an electric storage battery, the combination with a cell of insulating material; of a cover for said cell, having two electrode terminal outlets; two electrodes opposed in parallel position in said cell, each comprising a grid of cast metal having a socket for its terminal, and active material in each of said grids; each of said electrodes having a vertical passageway through its active material, exposing its active material to the electrolyte; said electrodes having metal terminals at respectively opposite ends thereof, fused in said sockets and extending through said terminal outlets in said cover; the terminal of the lower electrode extending through the upper electrode; insulating tubular sleeves, respectively incasing said terminals, the sleeve of the lower electrode extending through the upper electrode; and a separator between said electrodes.

3. The combination of two electrodes opposed in horizontally parallel position, each comprising a grid of cast metal having recessed passageways for electrolyte in its edge, and having a socket for its terminal, and active material in each of said grids; each of said electrodes having a vertical passageway through its active material, exposing its active material to the electrolyte; said electrodes having metal terminals at respectively opposite ends thereof, fused in said sockets; the terminal of the lower electrode extending through the upper electrode; insulating cylindrical tubular sleeves, of glass, respectively incasing said terminals, the sleeve of the lower electrode extending through the upper electrode; and a separator between said electrodes.

4. The combination of two electrodes opposed in horizontally parallel position, each comprising a grid of cast metal having a socket for its terminal, and active material in each of said grids; each of said electrodes having a vertical passageway through its active material, exposing its active material to the electrolyte; said electrodes having metal terminals at respectively opposite ends thereof, fused in said sockets; the terminal of the lower electrode extending through the upper electrode; insulating cylindrical tubular sleeves, of glass, respectively incasing said terminals, the sleeve of the lower electrode extending through the upper electrode; and a separator between said electrodes.

5. The combination of two electrodes opposed in horizontally parallel position, each comprising a grid of cast metal having recessed passageways for electrolyte in its edge, and having a socket for its terminal, and active material in each of said grids; said electrodes having metal terminals at respectively opposite ends thereof, fused in said sockets; the terminal of the lower electrode extending through the upper electrode; insulating cylindrical tubular sleeves, of glass, respectively incasing said terminals, the sleeve of the lower electrode extending through the upper electrode; and a separator between said electrodes.

6. The combination of two electrodes opposed in horizontally parallel position, each comprising a grid of cast metal having a socket for its terminal, and active material in each of said grids; said electrodes having metal terminals at respectively opposite ends thereof, fused in said sockets; the terminal of the lower electrode extending through the upper electrode; insulating cylindrical tubular sleeves, of glass, respectively incasing said terminals, the sleeve of the lower electrode extending through the upper electrode; and a separator between said electrodes.

7. The combination of two electrodes opposed in horizontally parallel position, each comprising a grid of cast metal having a socket for its terminal, and active material in each of said grids; said electrodes having metal terminals at respectively opposite ends thereof, fused in said sockets; the terminal of the lower electrode extending through the upper electrode; and insulating cylindrical tubular sleeves, of glass, respectively incasing said terminals, the sleeve of the lower electrode extending through the upper electrode.

8. The combination of two electrodes opposed in parallel position, each comprising a grid of cast metal having recessed passageways for electrolyte in its edge, and having a socket for its terminal, and active material in each of said grids; each of said electrodes having a passageway through its active material, exposing its active material to the electrolyte; said electrodes having metal terminals at respectively opposite ends thereof, fused in said sockets; the terminal of one electrode extending through the other electrode; insulating tubular sleeves respectively incasing said terminals, the sleeve of one electrode extending through the other electrode; and a separator between said electrodes.

In testimony whereof, I have hereunto signed my name at Philadelphia, Pennsylvania, this thirteenth day of January, 1914.

HIRAM HARRY HIRSCH.

Witnesses:
MICHAEL MARKS,
FRANCIS A. KOROSK.